(12) United States Patent
Kapralova et al.

(10) Patent No.: US 9,472,187 B2
(45) Date of Patent: Oct. 18, 2016

(54) ACOUSTIC MODEL TRAINING CORPUS SELECTION

(71) Applicant: Google Inc., Mountain View, CA (US)

(72) Inventors: Olga Kapralova, Bern (CH); John Paul Alex, Brooklyn, NY (US); Eugene Weinstein, New York, NY (US); Pedro J. Moreno Mengibar, Jersey City, NJ (US); Olivier Siohan, New York, NY (US); Ignacio Lopez Moreno, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/164,263

(22) Filed: May 25, 2016

(65) Prior Publication Data

US 2016/0267903 A1   Sep. 15, 2016

Related U.S. Application Data

(63) Continuation of application No. 14/693,268, filed on Apr. 22, 2015, now Pat. No. 9,378,731.

(60) Provisional application No. 62/055,252, filed on Sep. 25, 2014.

(51) Int. Cl.
*G10L 15/06* (2013.01)
*G10L 15/30* (2013.01)
*G10L 15/01* (2013.01)
*G10L 15/16* (2006.01)

(52) U.S. Cl.
CPC ............ *G10L 15/063* (2013.01); *G10L 15/01* (2013.01); *G10L 15/16* (2013.01); *G10L 15/30* (2013.01)

(58) Field of Classification Search
CPC ........ G10L 15/30; G10L 21/06; G10L 25/90; G10L 15/26; G06F 3/167
USPC ........................................................ 704/244
See application file for complete search history.

(56) References Cited

U.S. PATENT DOCUMENTS

2006/0149558 A1   7/2006   Kahn
2016/0093294 A1   3/2016   Kapralova et al.

OTHER PUBLICATIONS

Brants et al., "Large language models in machine translation," in EMNLP, Jun. 2007, pp. 858-867.

(Continued)

*Primary Examiner* — Charlotte M Baker
(74) *Attorney, Agent, or Firm* — Fish & Richardson P.C.

(57) ABSTRACT

The present disclosure relates to training a speech recognition system. One example method includes receiving a collection of speech data items, wherein each speech data item corresponds to an utterance that was previously submitted for transcription by a production speech recognizer. The production speech recognizer uses initial production speech recognizer components in generating transcriptions of speech data items. A transcription for each speech data item is generated using an offline speech recognizer, and the offline speech recognizer components are configured to improve speech recognition accuracy in comparison with the initial production speech recognizer components. The updated production speech recognizer components are trained for the production speech recognizer using a selected subset of the transcriptions of the speech data items generated by the offline speech recognizer. An updated production speech recognizer component is provided to the production speech recognizer for use in transcribing subsequently received speech data items.

20 Claims, 3 Drawing Sheets

(56) References Cited

OTHER PUBLICATIONS

Dean et al., "Large scale distributed deep networks," in NIPS, Dec. 2012, pp. 1232-1240.
Deng and Dahl, "Roles of pre-training and fine-tuning in context-dependent DBN-HMMs for real-world speech recognition," in NIPS, 2010, 8 pages.
Hinton et al., "Deep neural networks for acoustic modeling in speech recognition: The shared views of four research groups," IEEE Signal Process. Mag., vol. 29, No. 6, pp. 82-97, Nov. 2012.
Huang et al., "Semi-supervised GMM and DNN acoustic model training with multi-system combination and confidence re-calibration," in Interspeech, Aug. 2013, pp. 2360-2364.
Jaitly et al., "Application of pretrained deep neural networks to large vocabulary speech recognition," in Interspeech, 2012.
Jiang, "Confidence measures for speech recognition: A survey," Speech Communication, vol. 45, No. 4, pp. 455-470, Apr. 2005.
Kuo and Goel, "Active learning with minimum expected error for spoken language understanding," in Interspeech, Sep. 2005, pp. 437-440.
Lamel et al., "Lightly supervised and unsupervised acoustic model training," Computer Speech and Language, vol. 16, No. 1, pp. 115-229, Jan. 2002.
Liao et al., "Large scale deep neural network acoustic modeling with semi-supervised training data for youtube video transcription," in Workshop on Automatic Speech Recognition and Understanding (ASRU), 2013, 6 pages.
Ma and Schwartz, "Unsupervised versus supervised training of acoustic models," in Interspeech, Sep. 2008, pp. 2374-2377.
Schalkwyk et al., "Google search by voice: A case study," Advances in Speech Recognition: Mobile Environments, Call Centers and Clinics, pp. 61-20, Sep. 2010.
Siohan, "Training data selection based on context-dependent state matching," in ICASSP, 2014.
Young et al., "Tree-based state tying for accuracy acoustic modelling," in Proceedings of the Workshop on Human Language Technology, 1994, pp. 307-312.
Yu et al., "Unsupervised training and directed manual transcription for LVCSR," Speech Communication, vol. 52, No. 7-8, pp. 652-663, Jul. 2010.
Zeiler et al., "On rectified linear units for speech processing," in $38^{th}$ International Conference on Acoustics, Speech and Signal Processing (ICASSP), 2013.

ACOUSTIC MODEL TRAINING CORPUS SELECTION

CROSS-REFERENCE TO RELATED APPLICATION

This application is a continuation of U.S. application Ser. No. 14/693,268, filed Apr. 22, 2015, which claims the benefit of U.S. Provisional Pat. App. No. 62/055,252, filed Sep. 25, 2014, which is incorporated herein by reference.

TECHNICAL FIELD

This specification generally relates to speech recognition systems, and some implementations relate to selecting a training corpus for a speech recognition system.

BACKGROUND

Speech recognition relates to the transcription of words spoken by a human. In performing speech recognition, acoustic and language models are used by automated speech recognition (ASR) engines to statistically analyze an encoded utterance in order to create one or more likely text strings that reflect the words of the speaker. Many speech recognition models are neural network-based models that are trained from a corpus of transcribed speech.

SUMMARY

The present disclosure relates to training a speech recognition system. In one aspect, a computer-implemented method includes receiving a collection of speech data items, wherein each speech data item corresponds to an utterance that was previously submitted for transcription by a production speech recognizer, and wherein the production speech recognizer uses one or more initial production speech recognizer components in generating transcriptions of speech data items. The method also includes generating a transcription for each speech data item of the collection using an offline speech recognizer, wherein the offline speech recognizer uses one or more offline speech recognizer components, and wherein the one or more offline speech recognizer components are configured to improve speech recognition accuracy in comparison with the one or more initial production speech recognizer components. The method also includes selecting a subset of the transcriptions of the speech data items that are generated by the offline speech recognizer, training one or more updated production speech recognizer components for the production speech recognizer using the selected subset of the transcriptions of the speech data items that are generated by the offline speech recognizer, and providing the updated production speech recognizer component to the production speech recognizer for use in transcribing one or more subsequently received speech data items.

Implementations may include one or more of the following features. The production speech recognizer can include a first neural network-based acoustic model and the offline speech recognizer can include a different, second neural network-based acoustic model. The first neural network-based acoustic model can have fewer layers or nodes than the second neural network-based acoustic model. The production speech recognizer can include a first language model, and the offline speech recognizer can include a different, second language model. The first language model can have fewer n-grams or parameters than the second language model. The second language model can be a language model with greater than 15 million n-grams. The second language model can be a language model with 100 million n-grams. Selecting a subset of the transcriptions of the speech data items that are generated by the offline speech recognizer can include selecting a less than a maximum quantity of speech data items in the subset that are associated with a same transcription. A maximum quantity of speech data items in the subset that are associated with a same transcription can be 20. The method can include assigning a confidence measure to the transcriptions of the speech data items that are generated by the offline speech recognizer.

Other implementations of these and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Advantageous implementations may include one or more of the following features. The techniques described can take advantage of the large amount of traffic of existing speech recognition products. A large training corpus can be generated and selected with close to human transcriber quality in a relatively short amount of time. Rather than relying on small supervised training sets, the presently disclosed technique can exploit the large amount of audio data that is processed by some systems, together with semi-supervised techniques to construct large training sets with automatically derived transcripts. The technique is based on redecoding a massive amount of anonymized audio logs from speech products using a high accuracy, non-real-time system, followed by a series of heuristics aiming at discarding incorrectly recognized speech recordings. Such an automated procedure can enable the collection of training sets an order of magnitude larger than what is typically obtained by human transcription. Moreover, the use of a large-scale distributed computation platform can enable training sets to be produced in a matter of days, as compared to the months required to produce manually transcribed training sets with sufficient quality. Automatic generation of training sets also can enable relatively easily tracking of the continuous changes in mobile and desktop devices that use speech products.

The details of one or more implementations of the subject matter described in this specification are set forth in the accompanying drawings and the description below. Other potential features, aspects, and advantages of the subject matter will become apparent from the description, the drawings, and the claims.

DETAILED DESCRIPTION

In the field of speech recognition, there is a natural tension between recognition latency, i.e., the speed at which a speech recognizer generates a transcription of an utterance, and speech recognition accuracy, i.e., the extent to which a generated transcription matches the words that a user spoke. For example, a speech recognizer that includes a relatively large or relatively complex acoustic model and/or language model may provide more accurate transcriptions, but may also have a latency that is undesirable or impractical for a user. Conversely, a speech recognizer that includes a relatively small or relatively simple acoustic model and/or language model may provide quicker returned results, e.g., "real-time" transcription, but may also be more prone to generating erroneous transcriptions.

In many cases, a larger corpus of training data can enable a more accurate speech recognition system. For example, an acoustic model trained with a larger number of transcribed utterances can have a reduced word error rate. However, human transcription of utterances to generate a training corpus can be laborious and slow, and thus generating a large number of transcribed utterances, for example hundreds of millions of utterances, for training can be prohibitively inefficient.

Accordingly, the present disclosure describes techniques for automatically generating a large training corpus of transcribed utterances in a substantially unsupervised manner. One example technique uses a relatively slow and more accurate offline speech recognition system to re-decode utterances that were previously decoded by a production, e.g. real-time or near-real-time, speech recognition system. A real-time system is responsive within a period of time that is nearly imperceptible, e.g., a few milliseconds or less. The offline speech recognition system can have larger or more complex models than the production speech recognition system to increase accuracy. In this manner, a large number of transcribed utterances can be generated by the offline speech recognition system with an accuracy sufficiently comparable to human-transcribed utterances. A selected subset of these automatically generated transcriptions can be used to train a production speech recognition system. The larger training corpus provided by the offline speech recognizer can result in a more accurate production speech recognizer.

Figure 1:
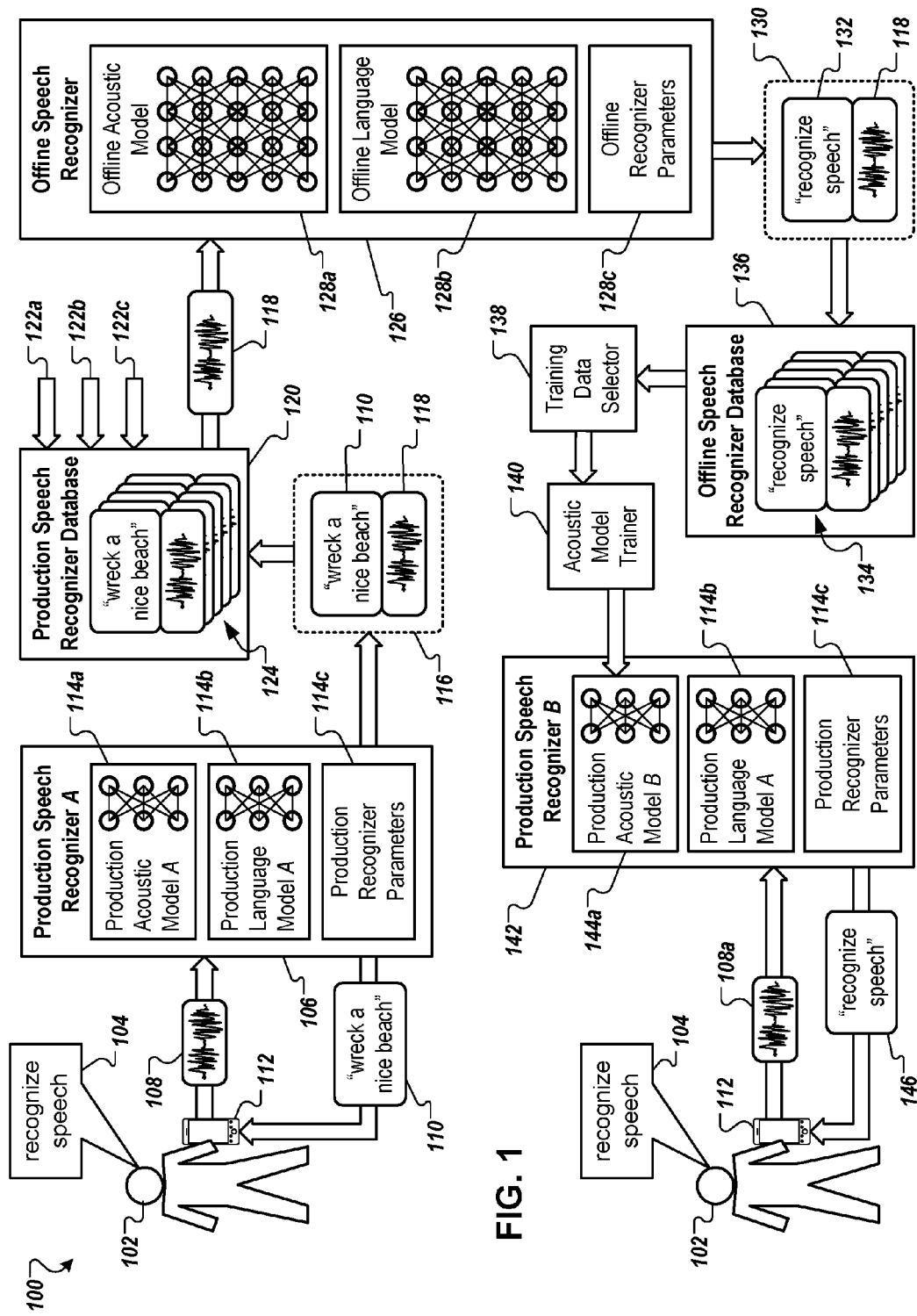
FIG. 1 is a diagram of an example speech recognition system.

FIG. 1 is a diagram of an example speech recognition system 100. A user 102 submits an utterance 104 to a Production Speech Recognizer A 106 for recognition and transcription. In this example, the utterance 104 submitted by user 102 is the phrase "recognize speech." The user 102 speaks utterance 104 into a computing device 112, e.g., a mobile computing device, tablet computer, wearable computer, e-book reader, desktop computer, laptop computer, etc. The computing device 112 may be running, for example, a text editor with a speech recognition input, a search-bar with free-form speech input, or any other appropriate program. The computing device 112 may generate a speech recognition request 108, containing a speech data item, e.g., a data file of a waveform, an audio file, or other data type, that encodes the utterance 104, and may transmit the request 108 to Production Speech Recognizer A 106.

Production Speech Recognizer A 106 is an example of a speech recognizer that receives a speech recognition request 108 associated with an utterance 104, analyzes the request 108, and generates a text transcription 110 of the utterance 104. Generally, the text transcription 110 may include a character string or other text representation that represent the speech recognizer's top hypothesis of the contents of the utterance of the request 108. The transcription 110 may be transmitted to the computing device 112 or to another system or program as applicable. The Production Speech Recognizer A 106 may transmit a transcription 110 to user 102 in real-time or near-real-time, but the speed-versus-accuracy tradeoff may result in more erroneous transcriptions, e.g., returned transcription 110 is "wreck a nice beach" instead of "recognize speech."

In general, a speech recognizer such as Production Speech Recognizer A 106 or Production Speech Recognizer B 142, described below, may receive speech recognition requests 108 from users in a large user base. A speech recognizer may, in response to each request 108, generate a text result 110 of one or more recognition processes run on the request 108 by the speech recognizer. Although a single user 102 is shown for clarity, a speech recognizer may receive requests 108 from a much larger number of users, e.g., tens of thousands, and may process some or all of the received requests 108 in parallel, providing each user with a text result 110 while other requests 108 are being received and processed.

Additionally, a speech recognizer may be any type of appropriate system to perform speech recognition tasks. For example, a speech recognizer may be constituted by a group of virtual machines or jobs running on a massively distributed computing environment that is also hosting virtual machines or jobs for different services, tasks, or applications. In some implementations, a speech recognizer may be a component of a large system of servers or services, or may be only one of many services offered in conjunction with some product or service.

The example Production Speech Recognizer A 106 may include one or more speech recognizer components that are used to generate text transcription 110. The speech recognizer components can be models, modules, algorithms, or other systems. For example, Production Speech Recognizer A 106 includes a Production Acoustic Model A 114a and a Production Language Model A 114b. Acoustic Model A 114a is an acoustic model that can generate a phonemic representation of the utterance 104. Production Language Model A 114b is a language model that can generate word probabilities based on the phonemic representation. Production Acoustic Model A 114a and/or Production Language Model A 114b may use recognition techniques such as neural network recognition as shown in FIG. 1, a Hidden Markov Model, or another technique or combination of techniques. Production Acoustic Model A 114a and Production Language Model A 114b may include algorithms, programs, and applications as appropriate for modeling. In some cases, Acoustic Model A 114a is constructed or trained from supervised speech data that is manually transcribed by humans.

The Production Speech Recognizer A 106 may also include Production Recognizer Parameters 114c including, but not limited to, beam punning, power of machines selected, the extra cost of operation, the number of working hypotheses, the number and/or type of concurrent recognition engines to run, vocabulary size to be used, sensitivity parameter, N best list length parameter, timeout parameter, and/or maximum search duration parameter.

A record 116 that includes a speech data item 118 that encodes the utterance 104 is transmitted to a Production Speech Recognizer Database 120. In some cases, the record 116 also includes the transcription 110, as shown. The Production Speech Recognizer Database 120 stores one or more records 116 received from Production Speech Recognizer A 106 as a collection of speech data items 124. The Production Speech Recognizer Database 120 may also receive multiple records 116 from one or more other sources 122a-c, including other speech recognizers. The stored speech data items 120 can correspond to utterances previously submitted for transcription by a speech recognizer from multiple different users in different contexts and environments, and as such can present a large and varied corpus of speech data items 124. For example, the stored speech data items 124 can represent decades of previously transcribed human speech.

The collection of speech data items 120 in Production Speech Recognizer Database 120 can be used to update and improve the accuracy of an initial production speech recognizer, e.g., Production Speech Recognizer A 106, as described herein. A subset of speech data items 124 can be transmitted from Production Speech Recognizer Database 120 to an Offline Speech Recognizer 126 for redecoding. In some cases, the transmitted speech data items are randomly selected from Production Speech Recognizer Database 120. In some cases, the transmitted speech data items are selected using a criterion, a process, or an algorithm. For example, the transmitted speech data items can be selected based on user information, e.g., user location or other user information, speech data item size, speech data item creation date, or other information. In some cases, a specific number of speech data items may be transmitted from Production Speech Recognizer Database 120 to Offline Speech Recognizer 126, e.g., one million, fifty million, three hundred million, etc.

The Offline Speech Recognizer 126 can include one or more offline speech recognizer components. The offline speech recognizer components can be models, modules, algorithms, or other systems. For example, Offline Speech Recognizer 126 includes an Offline Acoustic Model 128a and an Offline Language Model 128b. The Offline Speech Recognizer 126 is configured to favor accuracy over speed. Specifically, the Offline Speech Recognizer 126 is configured to improve speech recognition accuracy in comparison with the one or more production speech recognizer models used to provide speech data items 120. To improve accuracy, the Offline Speech Recognizer 126 may use a larger or more complex acoustic model and/or language model than those used in an initial production speech recognizer. For example, Production Speech Recognizer A 106 may use a 15M n-gram Production Language Model A 114b, and Offline Speech Recognizer 126 may use a larger 100M n-gram Offline Language Model 128b. In some cases, an n-gram Offline Language Model 128b less than 100M or larger than 100M may be used. As another example, the Offline Acoustic Model 128a could include a larger neural network, e.g., more layers, more nodes, etc., than a neural network used in an initial production speech recognizer. In some cases, the Offline Speech Recognizer 126 may use different recognizer parameters, i.e., Offline Recognizer Parameters 128c, than those used in an initial production speech recognizer, i.e., Production Recognizer Parameters 114c, in order to increase transcription accuracy. In some cases, the additional computational overhead incurred to produce higher-quality transcripts may be mitigated by use of a computing engine infrastructure.

Recoding the utterances initially decoded by the production speech recognizer, e.g., Production Speech Recognizer A 106, using the Offline Speech Recognizer 126 can result in a corpus of transcripts having a reduction in expected word error rate relative to the production speech recognizer. For example, FIG. 1 shows Offline Speech Recognizer 126 outputting an offline record 130 that includes speech data item 118 and an offline transcript 132. The example offline transcript 132 generated by the Offline Speech Recognizer 126, e.g., "recognize speech," is more accurate than the corresponding transcript 110 generated by Production Speech Recognizer A 106, e.g., "wreck a nice beach." In this manner, an Offline Speech Recognizer 126 can automatically generate a large number of transcripts with an accuracy sufficiently comparable to human-generated transcripts. Furthermore, the Offline Speech Recognizer 126 can generate the transcripts more quickly than humans. For example, in some cases 8,000 computing machines can reprocess 300M utterances in approximately 24 hours. The set of offline records 134, e.g., including offline record 130, generated by Offline Speech Recognizer 126 can be transmitted to and stored in Offline Speech Recognizer Database 136.

A subset of the set of offline records 134 may be used to train an updated production acoustic model in a production speech recognizer. This "training subset" of the offline records 134 may be selected by a Training Data Selector 138. For example, the Training Data Selector 138 can select tens of millions of records, for example 20 million, 30 million, or another number of records, within the set of offline records 134. In some cases, high-quality acoustic models may rely on the availability of large and reliably transcribed training data sets that match the underlying distribution of speech in different acoustic environments. It may also be important that the training data represent the demographic variety of the potential speakers well. The training subset of records may be selected to adequately include correct transcriptions while preserving the acoustic and linguistic diversity of the data. In some cases, to produce good quality in the transcriptions, utterance level confidence metrics may be derived from lattice posterior word probabilities. In some cases, utterance confidence measures may correlate with word error rate.

However, selecting a training subset by confidence score alone may bias the data selection towards frequent and easy to recognize queries. In some cases, this may lead to a disproportionately large fraction of the training subset having the same transcription. For example, popular queries such as "news," "movies," "music," or "photo" may dominate the resulting training subset resulting in a negative feedback loop. Techniques may be implemented to alleviate this problem. For example, an additional constraint may be introduced to minimize the cross entropy between the context dependent (CD) state distribution of the training subset and a manually transcribed testing set.

As another example, the number of utterances in the training subset with the same transcription may be limited to a certain number, e.g., ten, twenty, one hundred, or another number, an approach sometimes referred to as "transcription flattening." In some cases, this approach may enforce a more uniform triphone coverage and a larger vocabulary, while also ensuring that frequent tokens are not overrepresented. Additional constraints may also be applied on the training subset selection, such as removing utterances with short transcripts. A subset of offline records 134 with the highest confidence scores may then be retained. For example, millions of records, tens of millions of records, or another number of records can be retained.

The selected training subset may be used by an Acoustic Model Trainer 140 to train a Production Acoustic Model B 144a. Production Acoustic Model B 144a is a smaller or less complex model than Offline Acoustic Model 128*a*. For example, the Production Acoustic Model B 144*a* may include a neural network with the same configuration as the neural network of Production Acoustic Model A 106. Production Acoustic Model B 144*a* is trained with a larger set of training data than Production Acoustic Model A 106. Thus, Production Acoustic Model B 144*a* may have comparable speed to Production Acoustic Model A 106 but have increased accuracy. In some cases, Production Acoustic Model B 144*a* may be an updated version of Production Acoustic Model A 106. In some cases, the Acoustic Model Trainer 140 may train the neural network in one or more languages.

As a training example, a context dependent (CD) state inventory may first be derived using decision tree state clustering as is sometimes used for training Gaussian mixture models. To build this decision tree, the entire training subset may be used in order to cover as many triphone contexts as possible. Production Acoustic Model B 144*a* may contain a number of CD clustered states, e.g., thousands, tens of thousands, or another number, with slight variation by language.

For example, the input layer of a feed-forward fully connected neural network model may take as input 26 consecutive audio frames represented each by a 40-dimensional vector composed of log mel filterbank energies. The 26 audio frames may consist of 20 neighboring frames in the past, 5 neighboring frames in the future, and the current frame. For example, 8 hidden layers of 2560 nodes each may be used, and an approximately 18K-dimensional softmax output layer may be used. All hidden layer nodes may use a rectified linear function. Output layer nodes may use a softmax non-linearity and provide an estimate of the posterior probability of each CD state. For training, a mini batch asynchronous stochastic gradient descent may be implemented in a distributed framework. A cross entropy criterion may be used as the objective function. The initial learning rate may be set to 0.001 and decreased by a factor of ten every five billion frames. This is one example of training a neural network acoustic model; other neural network acoustic models with other features or parameters may be used, and other training techniques may be used.

The Acoustic Model Trainer 140 generates a trained Production Acoustic Model B 144*a*. Production Acoustic Model B 144*a* may be used in a Production Speech Recognizer B 142 that also includes Production Language Model A 114*b* and Production Recognizer Parameters 114*c*. For example, Production Acoustic Model B 144*a* may replace Production Acoustic Model A 114*a* in Production Speech Recognizer A 106, or be an updated version of Production Acoustic Model A 114*a*. As Production Speech Recognizer B 142 includes a more accurate Production Acoustic Model B 144*a*, it is less prone to error. As such, Production Speech Recognizer B 142 is more likely to return an accurate text transcription 146, e.g., "recognize speech," to the user 102.

Figure 2:
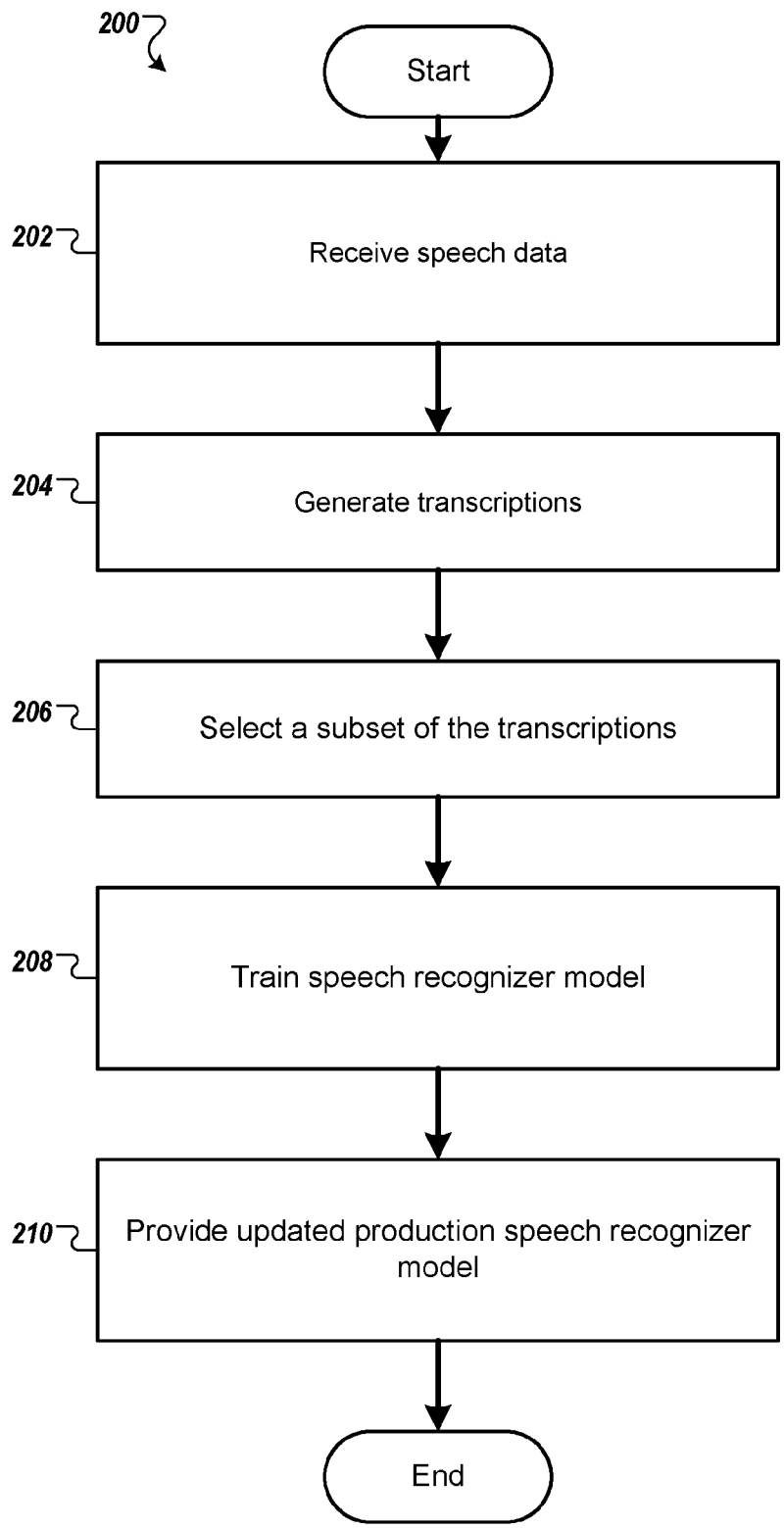
FIG. 2 is a flow chart illustrating an example process 200 for training an updated production speech recognizer.

FIG. 2 is a flow chart illustrating an example process 200 for training an updated production speech recognizer. The example process 200 may be implemented, for example, by some or all of speech recognition system 100. At 202, a collection of speech data items is received. The collection of speech data items may be received, for example, by an offline speech recognizer. Each speech data item may correspond to an utterance that was previously submitted for transcription by a production speech recognizer. For example, each speech data item may include a data file of a waveform, an audio file, or other data type that encodes an utterance. The production speech recognizer may use one or more initial production speech recognizer components in generating transcriptions of speech data items such as an acoustic model, a language model, or another type of speech recognizer component. One or more of the speech recognizer components may be neural network-based.

At 204 a transcription is generated for each speech data item of the collection using an offline speech recognizer. The offline speech recognizer uses one or more offline speech recognizer components, such as an acoustic model, a language model, or other type of speech recognizer component. One or more of the speech recognizer components may be neural network-based. One or more of the offline speech recognizer components may be configured to improve speech recognition accuracy in comparison with the one or more initial production speech recognizer components. For example, the production speech recognizer may include a first neural network-based acoustic model, and the offline speech recognizer may include a different, second neural network-based acoustic model, for which the first model has fewer layers or nodes than the second model.

At 206, a subset is selected of the transcriptions of the speech data items that are generated by the offline speech recognizer. During selection, a maximum quantity of speech data items in the subset that are associated with a same transcription may be determined. Additionally, a confidence measure may be assigned to the transcriptions of the speech data items that are generated by the offline speech recognizer.

At 208, one or more updated production speech recognizer components for the production speech recognizer are trained. The updated component(s) may be trained using the subset of the transcriptions selected at 206.

At 210, an updated production speech recognizer component is provided to the production speech recognizer for use in transcribing one or more subsequently received speech data items. In some implementations, the process 200 returns to 202 as additional speech data items are received that may be used to further update a production speech recognizer component. In this manner, a production speech recognizer component may be continuously or periodically updated using new speech data items.

Figure 3:
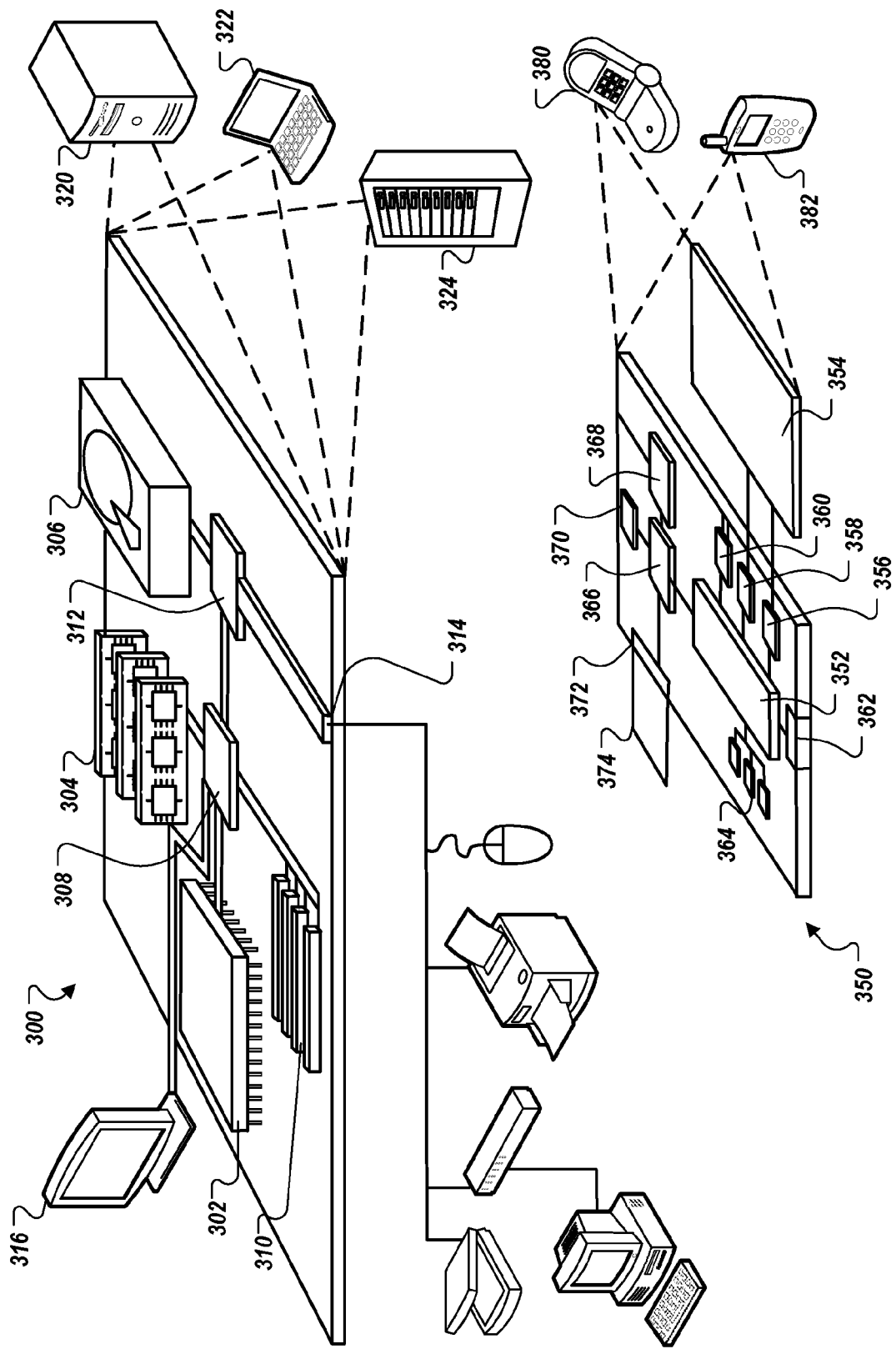
FIG. 3 shows an example of a computing device and an example of a mobile computing device that can be used to implement the techniques described here.

FIG. 3 shows an example of a computing device 300 and an example of a mobile computing device that can be used to implement the techniques described here. The computing device 300 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 300 includes a processor 302, a memory 304, a storage device 306, a high-speed interface 308 connecting to the memory 304 and multiple high-speed expansion ports 310, and a low-speed interface 312 connecting to a low-speed expansion port 314 and the storage device 306. Each of the processor 302, the memory 304, the storage device 306, the high-speed interface 308, the high-speed expansion ports 310, and the low-speed interface 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as a display 316 coupled to the high-speed interface 308. In other implementations, multiple processors and/or multiple buses may be used, as appropriate, along with multiple memories and types of memory. Also, multiple computing devices may be connected, with each device providing portions of the necessary operations, e.g., as a server bank, a group of blade servers, or a multi-processor system.

The memory 304 stores information within the computing device 300. In some implementations, the memory 304 is a volatile memory unit or units. In some implementations, the memory 304 is a non-volatile memory unit or units. The memory 304 may also be another form of computer-readable medium, such as a magnetic or optical disk.

The storage device 306 is capable of providing mass storage for the computing device 300. In some implementations, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 304, the storage device 306, or memory on the processor 302.

The high-speed interface 308 manages bandwidth-intensive operations for the computing device 300, while the low-speed interface 312 manages lower bandwidth-intensive operations. Such allocation of functions is exemplary only. In some implementations, the high-speed interface 308 is coupled to the memory 304, the display 316, e.g., through a graphics processor or accelerator, and to the high-speed expansion ports 310, which may accept various expansion cards (not shown). In the implementation, the low-speed interface 312 is coupled to the storage device 306 and the low-speed expansion port 314. The low-speed expansion port 314, which may include various communication ports, e.g., USB, Bluetooth, Ethernet, wireless Ethernet or others, may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. In addition, it may be implemented in a personal computer such as a laptop computer 322. It may also be implemented as part of a rack server system 324. Alternatively, components from the computing device 300 may be combined with other components in a mobile device (not shown), such as a mobile computing device 350. Each of such devices may contain one or more of the computing device 300 and the mobile computing device 350, and an entire system may be made up of multiple computing devices communicating with each other.

The mobile computing device 350 includes a processor 352, a memory 364, an input/output device such as a display 354, a communication interface 366, and a transceiver 368, among other components. The mobile computing device 350 may also be provided with a storage device, such as a micro-drive or other device, to provide additional storage. Each of the processor 352, the memory 364, the display 354, the communication interface 366, and the transceiver 368, are interconnected using various buses, and several of the components may be mounted on a common motherboard or in other manners as appropriate.

The processor 352 can execute instructions within the mobile computing device 350, including instructions stored in the memory 364. The processor 352 may be implemented as a chipset of chips that include separate and multiple analog and digital processors. The processor 352 may provide, for example, for coordination of the other components of the mobile computing device 350, such as control of user interfaces, applications run by the mobile computing device 350, and wireless communication by the mobile computing device 350.

The processor 352 may communicate with a user through a control interface 358 and a display interface 356 coupled to the display 354. The display 354 may be, for example, a TFT (Thin-Film-Transistor Liquid Crystal Display) display or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may provide communication with the processor 352, so as to enable near area communication of the mobile computing device 350 with other devices. The external interface 362 may provide, for example, for wired communication in some implementations, or for wireless communication in other implementations, and multiple interfaces may also be used.

The memory 364 stores information within the mobile computing device 350. The memory 364 can be implemented as one or more of a computer-readable medium or media, a volatile memory unit or units, or a non-volatile memory unit or units. An expansion memory 374 may also be provided and connected to the mobile computing device 350 through an expansion interface 372, which may include, for example, a SIMM (Single In Line Memory Module) card interface. The expansion memory 374 may provide extra storage space for the mobile computing device 350, or may also store applications or other information for the mobile computing device 350. Specifically, the expansion memory 374 may include instructions to carry out or supplement the processes described above, and may include secure information also. Thus, for example, the expansion memory 374 may be provide as a security module for the mobile computing device 350, and may be programmed with instructions that permit secure use of the mobile computing device 350. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 364, the expansion memory 374, or memory on the processor 352. In some implementations, the computer program product can be received in a propagated signal, for example, over the transceiver 368 or the external interface 362.

The mobile computing device 350 may communicate wirelessly through the communication interface 366, which may include digital signal processing circuitry where necessary. The communication interface 366 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 368 using a radio-frequency. In addition, short-range communication may occur, such as using a Bluetooth, WiFi, or other such transceiver (not shown). In addition, a GPS (Global Positioning System) receiver module 370 may provide additional navigation- and location-related wireless data to the mobile computing device 350, which may be used as appropriate by applications running on the mobile computing device 350.

The mobile computing device 350 may also communicate audibly using an audio codec 360, which may receive spoken information from a user and convert it to usable digital information. The audio codec 360 may likewise generate audible sound for a user, such as through a speaker, e.g., in a handset of the mobile computing device 350. Such sound may include sound from voice telephone calls, may include recorded sound, e.g., voice messages, music files or others, and may also include sound generated by applications operating on the mobile computing device 350.

The mobile computing device 350 may be implemented in a number of different forms, as shown in the figure. For example, it may be implemented as a cellular telephone 380. It may also be implemented as part of a smart-phone 382, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device, e.g., a CRT (cathode ray tube) or LCD (liquid crystal display) monitor for displaying information to the user, and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback, and input from the user may be received in any form, including acoustic, speech, or tactile input.

The systems and techniques described here may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the systems and techniques described here, or any combination of such back end, middleware, or front end components. The components of the system may be interconnected by any form or medium of digital data communication, e.g., a communication network. Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
   re-transcribing a set of audio samples that were previously submitted to an online speech recognizer, using an offline speech recognizer that exhibits increased speech recognition accuracy with respect to the online speech organizer;
   generating an update to the online speech recognizer using one or more of the re-transcribed audio samples that were re-transcribed using the offline speech recognizer that exhibits increased speech recognition accuracy with respect to the offline speech recognizer; and
   providing the update to the online speech recognizer for use in transcribing one or more subsequently received audio samples.

2. The method of claim 1, comprising:
   obtaining the set of audio samples from a database associated with the online speech recognizer, wherein the set of audio samples obtained from the database associated with the online speech recognizer are randomly selected.

3. The method of claim 1, comprising:
   obtaining the set of audio samples a database associated with the online speech recognizer, wherein the set of audio samples obtained from the database associated with the online speech recognizer are selected based on (i) speech sample size or (ii) speech sample creation date.

4. The method of claim 1,
wherein the online speech recognizer includes a first neural network,
wherein the offline speech recognizer includes a second neural network,
wherein the first neural network includes fewer layers than the second neural network.

5. The method of claim 1,
wherein the online speech recognizers includes a first language model,
wherein the offline speech recognizer includes a second language model,
wherein the first language model includes fewer N-grams than the second language model.

6. The method of claim 1, comprising:
assigning a confidence score to each of the one or more re-transcribed audio samples, wherein the one or more re-transcribed audio samples that are used to generate the update to the online speech recognizer are selected based on the confidence score.

7. The method of claim 1, wherein a number of the one or more re-transcribed audio samples used to generate the update to the online speech recognizer that correspond to the same transcription does not exceed a predetermined threshold.

8. A system comprising:
one or more computers and one or more storage devices storing instructions that are operable, when executed by the one or more computers, to cause the one or more computers to perform operations comprising:
re-transcribing a set of audio samples that were previously submitted to an online speech recognizer, using an offline speech that exhibits increased speech recognition accuracy with respect to the online speech organizer;
generating an update to the online speech recognizer using one or more of the re-transcribed audio samples that were re-transcribed using the offline speech recognizer that exhibits increased speech recognition accuracy with respect to the offline speech recognizer; and
providing the update to the online speech recognizer for use in transcribing one or more subsequently received audio samples.

9. The system of claim 8, wherein the operations comprise:
obtaining the set of audio samples from a database associated with the online speech recognizer, wherein the set of audio samples obtained from the database associated with the online speech recognizer are randomly selected.

10. The system of claim 8, the operations comprising:
obtaining the set of audio samples a database associated with the online speech recognizer, wherein the set of audio samples obtained from the database associated with the online speech recognizer are selected based on (i) speech sample size or (ii) speech sample creation date.

11. The system of claim 8,
wherein the online speech recognizer includes a first neural network,
wherein the offline speech recognizer includes a second neural network,
wherein the first neural network includes fewer layers than the second neural network.

12. The system of claim 8,
wherein the online speech recognizers includes a first language model,
wherein the offline speech recognizer includes a second language model,
wherein the first language model includes fewer N-grams than the second language model.

13. The system of claim 8, the operations comprising:
assigning a confidence score to each of the one or more re-transcribed audio samples, wherein the one or more re-transcribed audio samples that are used to generate the update to the online speech recognizer are selected based on the confidence score.

14. A non-transitory computer-readable medium storing software comprising instructions executable by one or more computers which, upon such execution, cause the one or more computers to perform operations comprising:
re-transcribing a set of audio samples that were previously submitted to an online speech recognizer, using an offline speech that exhibits increased speech recognition accuracy with respect to the online speech organizer;
generating an update to the online speech recognizer using one or more of the re-transcribed audio samples that were re-transcribed using the offline speech recognizer that exhibits increased speech recognition accuracy with respect to the offline speech recognizer; and
providing the update to the online speech recognizer for use in transcribing one or more subsequently received audio samples.

15. The non-transitory computer-readable medium of claim 14, wherein the operations comprise:
obtaining the set of audio samples from a database associated with the online speech recognizer, wherein the set of audio samples obtained from the database associated with the online speech recognizer are randomly selected.

16. The non-transitory computer-readable medium of claim 14, wherein the operations comprise:
obtaining the set of audio samples a database associated with the online speech recognizer, wherein the set of audio samples obtained from the database associated with the online speech recognizer are selected based on (i) speech sample size or (ii) speech sample creation date.

17. The non-transitory computer-readable medium of claim 14,
wherein the online speech recognizer includes a first neural network,
wherein the offline speech recognizer includes a second neural network,
wherein the first neural network includes fewer layers than the second neural network.

18. The non-transitory computer-readable medium of claim 14,
wherein the online speech recognizers includes a first language model,
wherein the offline speech recognizer includes a second language model,
wherein the first language model includes fewer N-grams than the second language model.

19. The non-transitory computer-readable medium of claim 14, wherein the operations comprise:

assigning a confidence score to each of the one or more re-transcribed audio samples, wherein the one or more re-transcribed audio samples that are used to generate the update to the online speech recognizer are selected based on the confidence score.

20. The non-transitory computer-readable medium of claim 14, wherein a number of the one or more re-transcribed audio samples used to generate the update to the online speech recognizer that correspond to the same transcription does not exceed a predetermined threshold.

* * * * *